(12) United States Patent
Blanchard et al.

(10) Patent No.: US 8,070,445 B2
(45) Date of Patent: Dec. 6, 2011

(54) BALANCING SYSTEM FOR TURBOMACHINE ROTOR

(75) Inventors: Stephane Pierre Guillaume Blanchard, Chartrettes (FR); Fabrice Garin, Boissise la Bertrand (FR); Maurice Guy Judet, Dammarie les Lys (FR); Thomas Langevin, Dammarie les Lys (FR)

(73) Assignee: SNECMA, Paris (FR)

( * ) Notice: Subject to any disclaimer, the term of this patent is extended or adjusted under 35 U.S.C. 154(b) by 1078 days.

(21) Appl. No.: 11/877,217

(22) Filed: Oct. 23, 2007

(65) Prior Publication Data

US 2008/0095613 A1 Apr. 24, 2008

(30) Foreign Application Priority Data

Oct. 24, 2006 (FR) ...................................... 06 54492

(51) Int. Cl.
*F01D 25/04* (2006.01)
(52) U.S. Cl. ........................ 416/144; 416/145
(58) Field of Classification Search .................. 416/144, 416/145
See application file for complete search history.

(56) References Cited

U.S. PATENT DOCUMENTS

| 4,803,893 A | * | 2/1989 | Bachinski | ...................... 416/145 |
| 4,879,792 A | * | 11/1989 | O'Connor | ........................ 29/889 |
| 7,491,031 B2 | * | 2/2009 | Brault et al. | ................... 416/144 |

FOREIGN PATENT DOCUMENTS

EP 1 380 722 A1 1/2004

OTHER PUBLICATIONS

U.S. Appl. No. 11/875,312, filed Oct. 19, 2007, Blanchard, et al.

* cited by examiner

*Primary Examiner* — Edward Look
*Assistant Examiner* — Dwayne J White
(74) *Attorney, Agent, or Firm* — Oblon, Spivak, McClelland, Maier & Neustadt, L.L.P.

(57) ABSTRACT

The present invention relates to a turbomachine rotor balancing system comprising a balancing flange (52) provided with through-passageways (78), the system further comprising balance weights (54) each mounted fixedly on the flange (52) by means of a first and a second screw/nut assembly (56*a*, 56*b*) having a first and a second screw (84, 84) passing through a first and a second passageway (78, 78). According to the invention, said first screw is pressing against a first tangential end side (116) of the first through-passageway, and at a distance from a second tangential end side, and the second screw is pressing against a second tangential end side (118) of the second through-passageway, and at a distance from the first tangential end side.

18 Claims, 5 Drawing Sheets

BALANCING SYSTEM FOR TURBOMACHINE ROTOR

BACKGROUND OF THE INVENTION

The present invention relates in a general manner to a turbomachine rotor balancing system and to a turbomachine module comprising at least one such balancing system.

The invention also relates to a turbomachine fitted with at least one such module, the turbomachine preferably taking the form of a turbojet for an aircraft.

DESCRIPTION OF THE PRIOR ART

On existing turbomachine modules, such as compressors or turbines, a rotor balancing system is usually provided comprising an annular balancing flange on which balance weights are mounted with the aid of bolts housed in through-passageways of the annular flange. The weights may therefore be distributed around the flange in the desired manner, providing a good balancing of the associated turbomachine module. Accordingly, this type of rotor balancing system is usually qualified as modular.

More precisely, the annular balancing flange usually comprises an annular core delimited radially in a first direction by a junction zone from which extends radially in this first direction a plurality of through-passageways, toward a radial free flange end, each through-passageway having a radial summit, in a second direction opposite to the first direction, belonging to said junction zone. Usually, the first direction is the one going radially inward, and the second opposite direction is the one going radially outward.

In addition, the system therefore comprises a plurality of balance weights mounted fixedly on the annular balancing flange by means of at least one screw/nut assembly passing through one of the passageways, the screw head pressing against a first face of the annular balancing flange and the balance weight pressing against a second face of the annular balancing flange, opposite to the first face.

More precisely, each balance weight is mounted on the flange by means of two screw/nut assemblies, of which the screw of each of them passes through its associated passageway, dimensioned accordingly. For this reason, to hold the balance weight relative to the flange, in the tangential direction and more specifically in both directions of the latter, the through-passageway is usually dimensioned so that each screw is substantially pressing on either side against respectively a first and a second tangential end side of this passageway. In other words, the width of the passageway in the tangential direction is substantially identical to the diameter of the associated screw.

Moreover, during studies carried out in the context of determining the stresses sustained by the balancing flange, it has been noted that the highest tangential stresses were located at the radial summit of each through-passageway, hence on or close to the aforementioned junction zone. As an indication, it is specified that the tangential stresses are essentially linked to the centrifugal or thermal effects.

However, the achievement of the tangential hold of the balance weight explained above, namely by double pressure of each screw against respectively the two tangential end sides of the passageway, does not make it possible to offer great freedom in the design of the radial end portion of the passageway, which therefore remains under great tangential stress.

Therefore, the radial end portion and more particularly its radial summit forming a zone of great concentration of stresses, the service life of the balancing flange remains too short, and the risks of deterioration of this flange are very high.

SUMMARY OF THE INVENTION

The object of the invention is therefore to propose a turbomachine rotor balancing system and a turbomachine module remedying the abovementioned disadvantages relating to the embodiments of the prior art.

To do this, the subject of the invention is first of all a turbomachine rotor balancing system comprising a balancing flange provided with a plurality of through-passageways, the system also comprising a plurality of balance weights each mounted fixedly on the balancing flange by means of a first and a second screw/nut assembly having respectively a first screw and a second screw passing respectively through a first and a second directly consecutive passageway, each of the passageways having a first and a second tangential end side situated on either side of the screw of the associated screw/nut assembly, the second tangential end side being offset tangentially from the first tangential end side in a first direction and the first through-passageway being offset tangentially from the second through-passageway in a second direction opposite to the first direction.

According to the invention, the first screw is pressing against the first tangential end side of the first through-passageway and at a distance from the second tangential end side, and the second screw is pressing against the second tangential end side of the second through-passageway and at a distance from the first tangential end side.

Consequently, the invention proposes an original manner of achieving the hold of the balance weights on the balancing flange, in both directions of the tangential line. Specifically, the pressure of the first screw against the first tangential end side of the first through-passageway makes it possible to immobilize the balance weight in the second direction of the tangential line relative to the flange, while the pressure of the second screw against the second tangential end side of the second through-passageway makes it possible to immobilize the balance weight in the first direction of the tangential line relative to this same flange. Consequently, the tangential attachment of each weight is advantageously provided without it being necessary to provide through-passageways of tangential width substantially equal to the diameter of the associated screw.

Consequently, this makes it possible to have greater freedom in the design of the radial end portion of the through-passageways, thereby offering the possibility of choosing the most suitable shape possible in order to minimize the concentration of tangential stresses being applied to said radial end portion.

Therefore, with the present invention in which each screw therefore has a diameter less than the tangential width of the passageway that it passes through, it becomes advantageously possible to adopt a passageway shape ensuring an increased service life of the balancing flanges, and also a reduction in the risks of deterioration of the latter.

Preferably, in cross section of the flange passing through the through-passageways, for each of these through-passageways, a maximum distance D in the tangential direction between the two tangential end sides is greater than a maximum length d of said screw in this same tangential direction, so that the ratio $D/d$ lies between 1.2 and 2, and more preferably substantially equal to 1.5.

Furthermore, it is possible to arrange that, in cross section of the flange passing through the through-passageways, each of these through-passageways has an axis of symmetry extending radially, and that a screw axis of the screw passing through this passageway is offset tangentially from the axis of symmetry.

Preferably, in cross section of the flange passing through the through-passageways, each of the through-passageways has a radial end portion consisting of an arc of a circle with a radius R1 on either side of which there are respectively two arcs of a circle of radius R2 less than the radius R1. It has specifically been noted that this particular shape, gentle and evolutive, that can be envisaged thanks to making the tangential width of the passageway larger, made it possible to reduce the accident of shape formerly encountered at the radial end portion of the passageway, and therefore to minimize the concentrations of stresses at the bottom of this passageway.

Preferably, the radius R2 is substantially identical to the radius of the screw passing through the associated passageway.

Finally, each through-passageway takes the form of a scallop or a hole. As an indication, the scallop is conventionally radially open in the first direction, namely opening at said radial free flange end, while the hole for its part has a closed section.

Also, a further subject of the invention is a turbomachine module comprising at least one rotor balancing system as explained above.

Preferably, the module is a turbine or high pressure or low pressure turbomachine compressor.

Finally, another subject of the invention is a turbomachine such as an aircraft turbojet comprising at least one module as described above.

Other advantages and features of the invention will appear in the nonlimiting description detailed below.

BRIEF DESCRIPTION OF THE DRAWINGS

This description will be made with respect to the appended drawings amongst which.

DETAILED DESCRIPTION OF THE PREFERRED EMBODIMENTS

Figure 1:
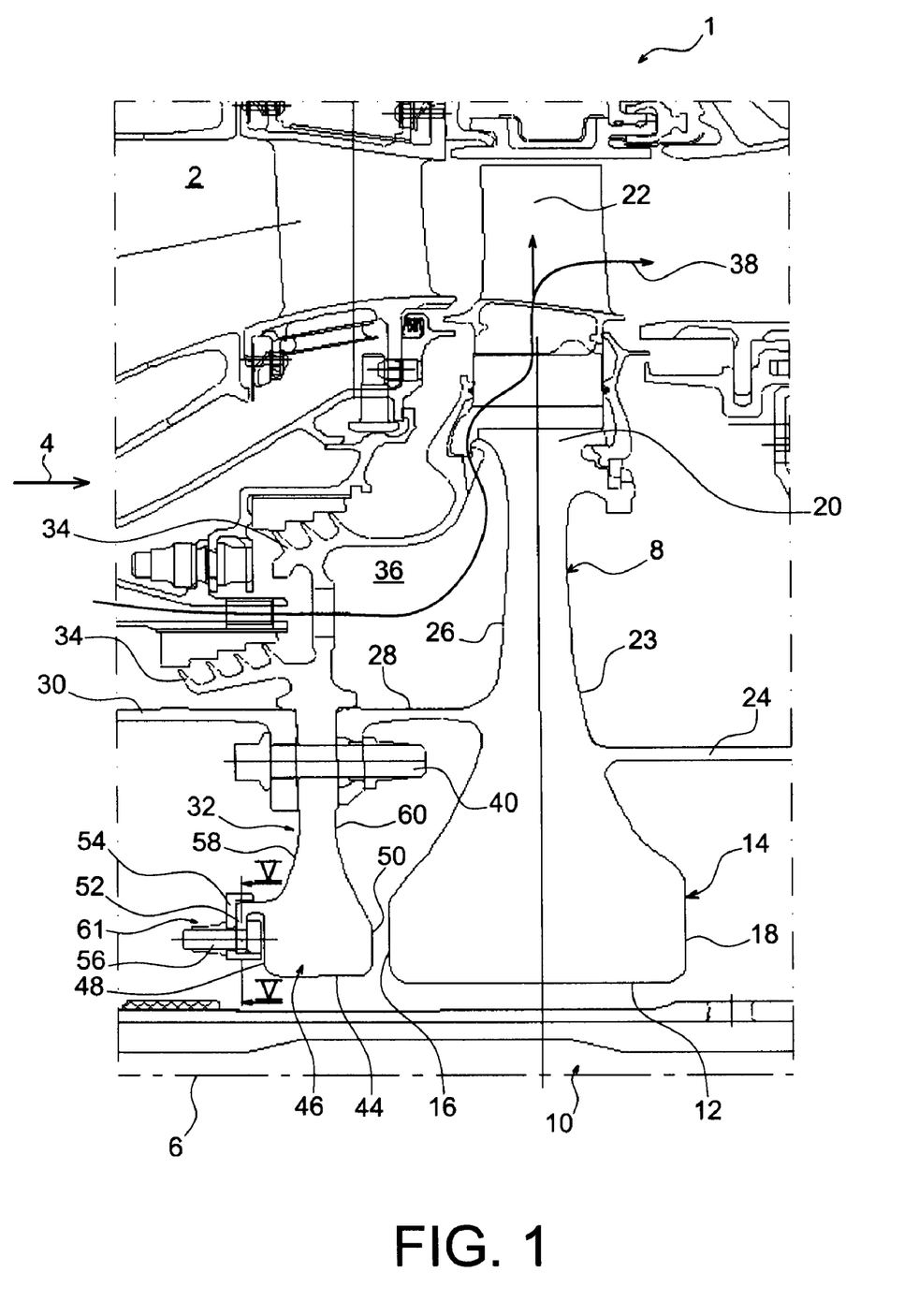
FIG. 1 represents a partial side view of a turbomachine module according to a preferred embodiment of the present invention.

FIG. 1 shows a portion of a turbomachine module 1 according to a preferred embodiment of the present invention, this module here being a high pressure turbine called an HP turbine of the turbomachine, taking, for its part, the form of a turbojet for an aircraft.

In FIG. 1, the rotor portion of the HP turbine can be seen situated downstream of a combustion chamber 2 of the turbojet. In this respect, it is noted that the concepts "downstream" and "upstream" employed below are to be considered in relation to a main direction of flow of the gases through the turbomachine, indicated schematically by the arrow 4, this direction being substantially parallel to a longitudinal axis 6 of the turbojet corresponding simultaneously to an axis of the module 1 and of the disks comprising it.

Specifically, the module 1 comprises a main rotor disk called the blade support disk 8, with an axis 6 passing through a system of axes 10 of the turbojet thanks to the presence of a bore 12. More precisely, this bore 12 is made in a known manner at an enlarged inner radial portion 14, forming the thickest portion of the disk 8, and delimited by an upstream face 16 and a downstream face 18 both orthogonal to the axis 6. The enlarged inner radial portion 14, also called the "leek", therefore has a substantially constant thickness in the direction of the axis 6, that is equal to the length of the bore 12 in this same direction.

At an outer radial end portion 20 of the disk 8 turbine blades 22 are mounted through which the gases escaping from the combustion chamber 2 can expand.

On the downstream side 23 of the blade support disk 8 a connecting annular flange 24 is arranged that is used for attaching this disk 8 to a downstream portion of the module, not shown. As can be seen in FIG. 1, the downstream annular connecting flange 24 protrudes from the downstream side 23 with which it is made in a single piece, at a portion situated above the enlarged inner radial portion 14.

On the other hand, on the upstream side 26 of the blade support disk 8 another annular connecting flange 28 is arranged that is used to attach this disk 8 to another turbomachine module, and more specifically to the high pressure compressor, called the HP compressor (not shown), comprising for its part a downstream connecting annular flange 30. Here again, as can be seen in FIG. 1, the upstream connecting annular flange 28 protrudes from the upstream side 26 with which it is made in a single piece, at a portion situated above the enlarged inner radial portion 14.

Also, in addition to the function of assembly with the HP compressor, this upstream connecting annular flange 28 is also used for the mounting of a labyrinth disk 32 situated upstream of the blade support disk 8, whose main function known to those skilled in the art resides in helping to cool this disk 8 and the blades that it supports. Specifically, the disk 32, comprising one or more annular sealing devices of the labyrinth type 34 lying tangentially to the stator of the module, makes it possible to define an annular cooling space 36 toward the downstream, between itself and the disk 8 to be cooled. Therefore, the cool air entering this space 36 closely follows the upstream side 26 of the disk 8, before rejoining radially outward a circuit of air through the blades 22, as shown schematically by the arrow 38 of FIG. 1.

In this preferred embodiment of the present invention, the labyrinth disk 32 is arranged between the two annular connecting flanges 28, 30, on which it is fixedly mounted with the aid of bolts 40 used to assemble the two flanges, and distributed about the axis 6.

The labyrinth disk 32 also passes through the system of axes 10 of the turbojet, thanks to the presence of a bore 44. More precisely, this bore 44 is made in a known manner at an enlarged inner radial portion 46, constituting the thickest portion of the disk 32 and delimited by an upstream face 48 and a downstream face 50 both orthogonal to the axis 6. The enlarged inner radial portion 46, also called the "leek", therefore has a substantially constant thickness in the direction of the axis 6, that is equal to the length of the bore 44 in this same direction.

In this preferred embodiment, an annular balancing flange 52 is arranged, fitted with balance weights 54, on the enlarged inner radial portion 46. More precisely, this annular balancing flange 52 is made in a single piece with the enlarged inner radial portion 46 from which it protrudes upstream then radially inward, from the face 48. In a general manner, the flange 52 and the weights 54 being fitted thereto in a determined manner together form a turbomachine rotor balancing system 61.

Since this balancing flange 52 is separate from the connecting flanges indicated above, the balance weights 54 may then be mounted definitively on this flange 52 before the operation of joining the module 1 with another turbomachine module. The manufacturer of such a turbomachine module 1 is consequently able to ensure a satisfactory installation of the balancing system, in particular of the weights 54 on the flange 52 with the aid of bolts 56, because the subsequent assembly of this same module 1 with another turbomachine module, in this instance the HP compressor, does not require any disassembly/assembly of the balance weights already installed on the flange 52 provided for this purpose.

As can be seen in FIG. 1, it can be arranged for the balancing flange 52 to protrude upstream from the face 48 at the outer radial end of the latter, namely at the intersection of this face 48 orthogonal to the axis 6 with the rest of an upstream side 58 of this disk 32, opposite to a downstream side 60 delimiting the cooling space 36.

Consequently, it must be understood that the balancing flange 52 is deprived of a function of connection with another element of the turbomachine, whether it be an element of the same module 1 or of an adjacent module of the turbomachine, which means that its function resides only in supporting the balance weights 54. Therefore, no element of the turbomachine other than the balance weights 54 is attached to this annular balancing flange 52, which, as can be seen in FIG. 1, is placed radially internally relative to the aforementioned connecting annular flanges 28, 30 used for the connection of the HP turbine to the HP compressor, and for the support of the labyrinth disk 32.

Figure 2:
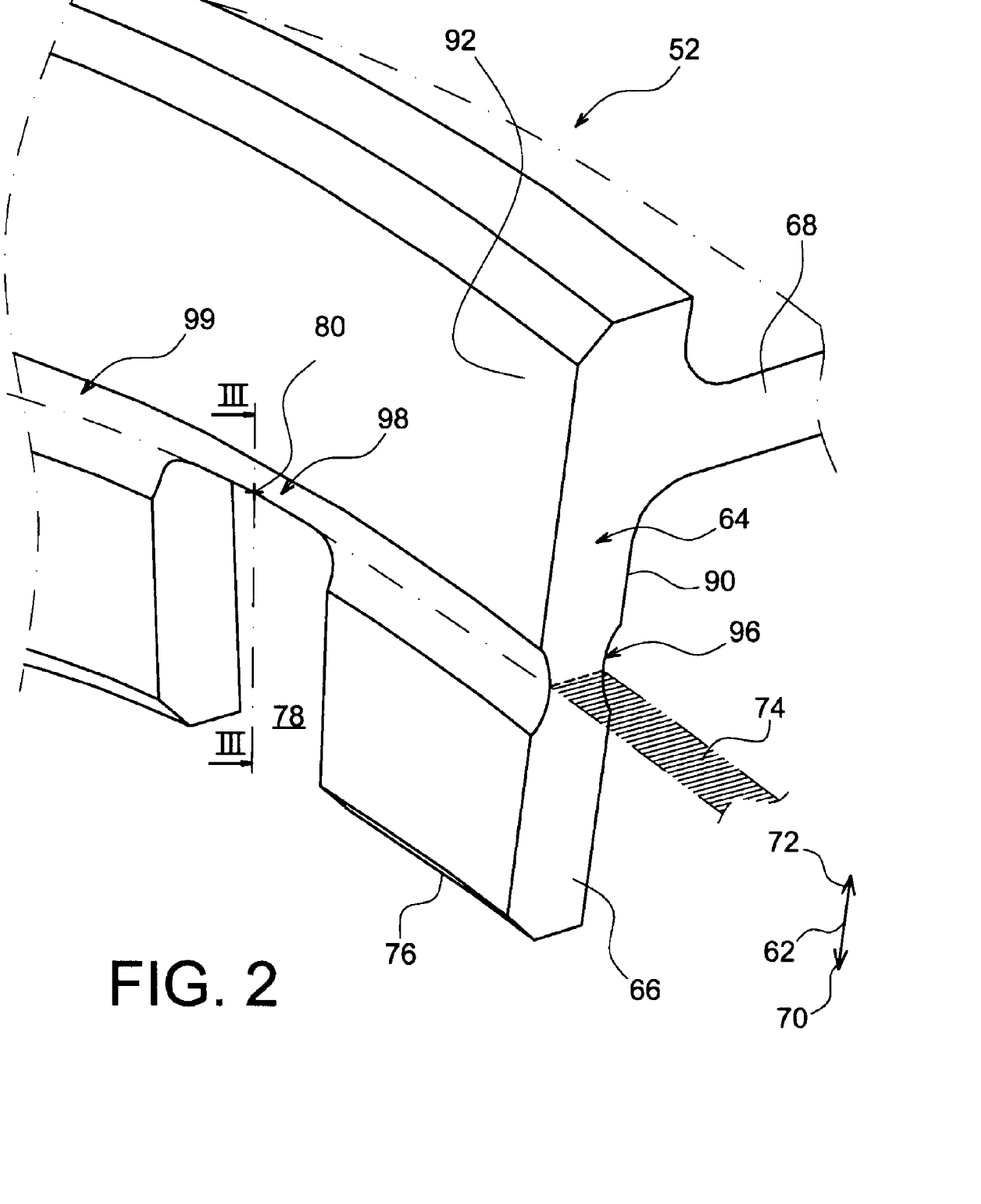
FIG. 2 shows a partial view in perspective of the annular balancing flange designed to form an integral part of the rotor balancing system belonging to the turbomachine module shown in FIG. 1.
Figure 3:
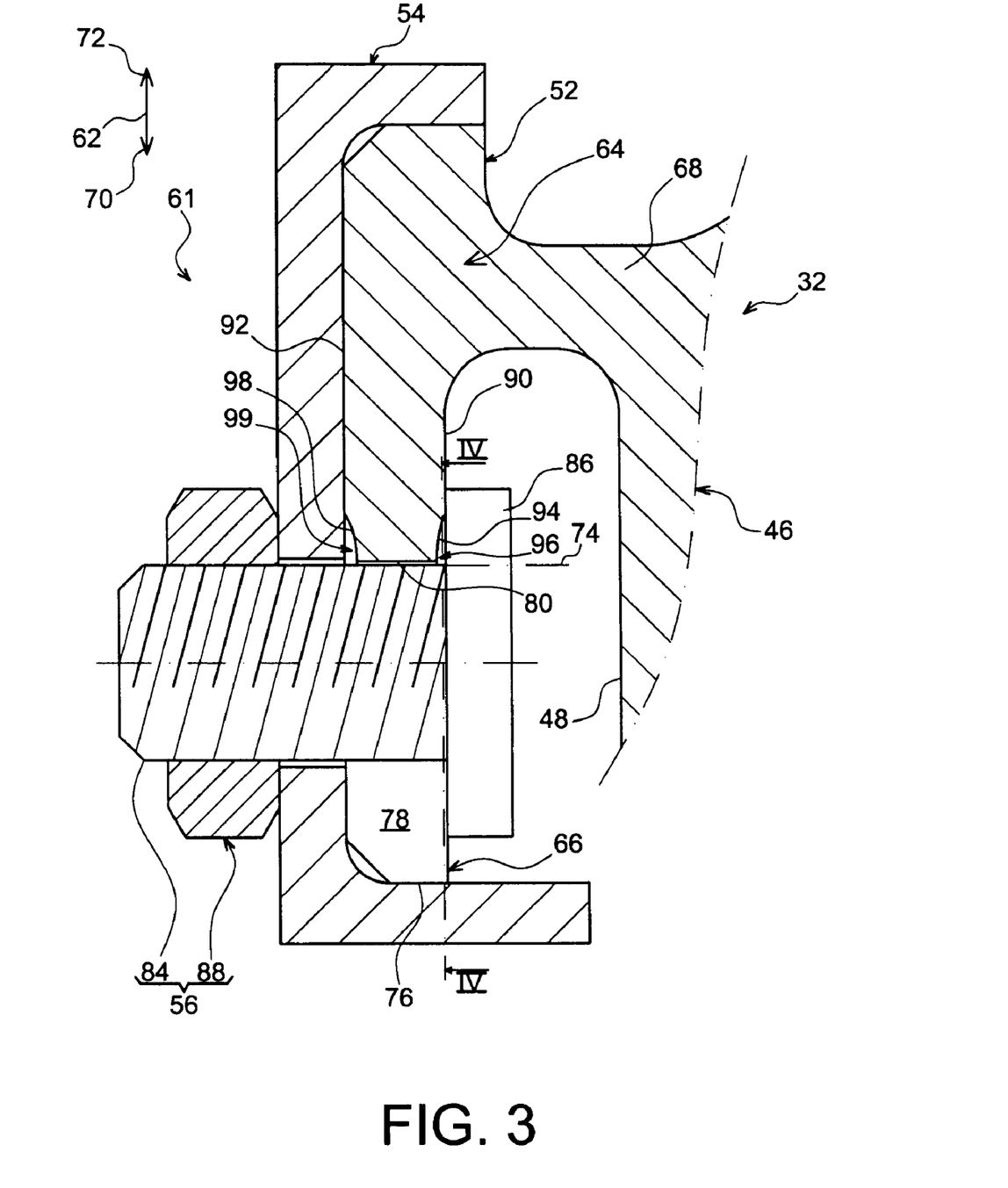
FIG. 3 shows a view in section along the line III-III of FIG. 2, to which a balance weight and its associated assembly means have been added.
Figure 4:
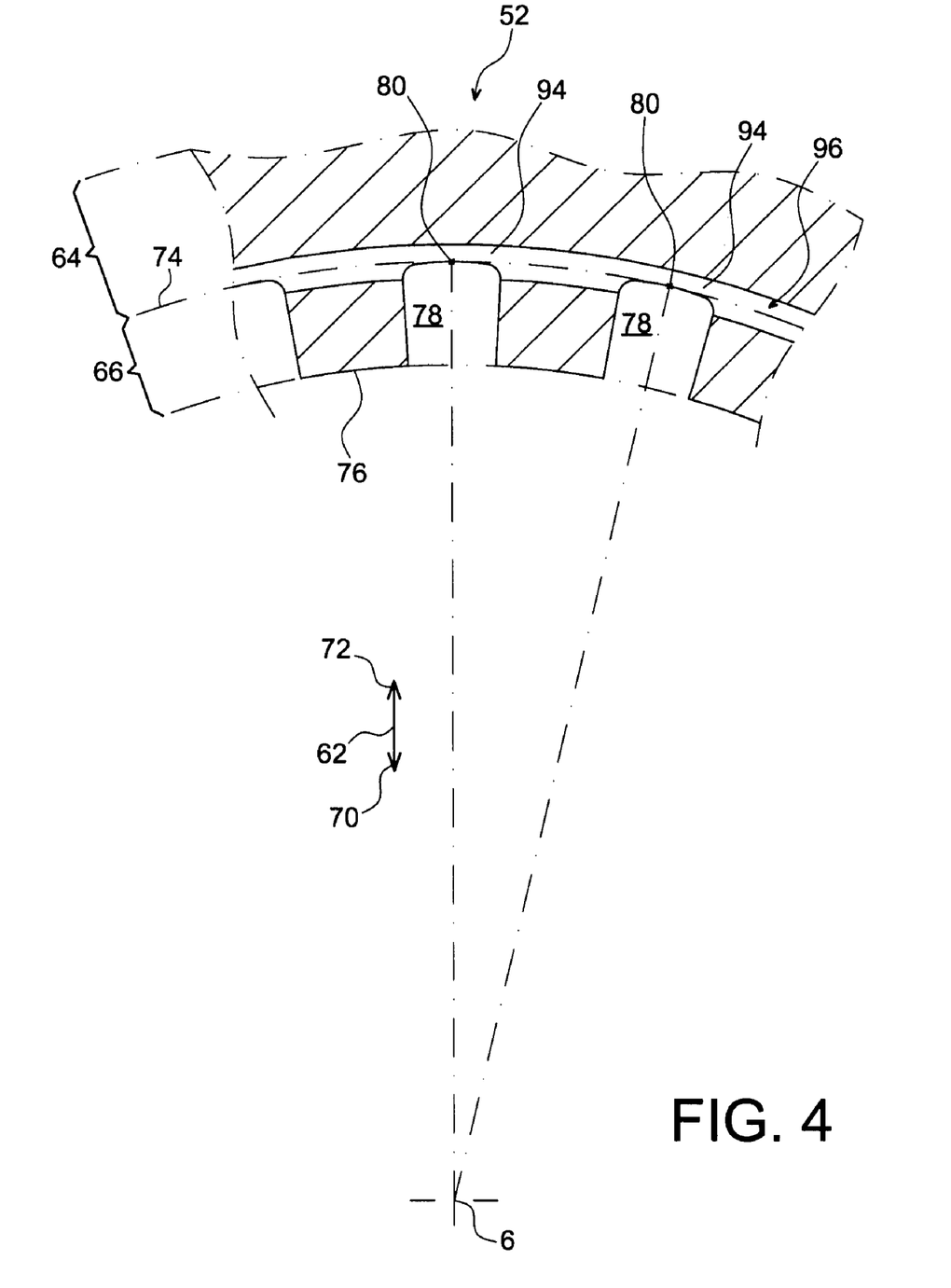
FIG. 4 shows a view in section along the line IV-IV of FIG. 3.

Now with reference to FIGS. 2 to 4, a preferred design of the annular balancing flange 52 with the axis 6, also called the axis of the annular flange, can be seen.

The annular balancing flange 52 essentially comprises two portions that are adjacent and offset in a radial direction 62 of the flange, namely an annular core 64 forming the outer radial portion of this flange, and a pierced portion 66 forming the inner radial portion of the latter. The core 64, or main portion of the flange 52, is solid and incorporates an annular connecting portion 68 providing the connection of the flange to the face 48 of the enlarged inner radial portion 46 of the disk 32.

The core 64 therefore extends in the radial direction 62 in a first direction 70 corresponding to the inward direction, to a zone called the junction zone schematized by the dashed lines 74 and separating this core 64 from the pierced portion 66, the junction zone 74 preferably taking the form of a fictional cylinder of circular section centered on the axis 6. Note that the second direction 72 associated with the radial direction 62 and shown in the figures corresponds to the outward direction.

The annular pierced portion 66 therefore extends radially from the junction zone 74, in the first direction 70, up to a radial free flange end 76. This portion 66 therefore incorporates through-passageways 78 that each extend radially from the junction zone 74, in the first direction 70 toward the radial free flange end 76. Here, the passageways 78 take the form of scallops, namely they extend radially over the whole annular pierced portion 66, since they open radially inward at the radial free flange end 76. In other words, they each have an open contour, unlike a hole having a closed contour. Accordingly, the passageways 78 could alternatively take the form of a hole, without departing from the context of the present invention.

In addition, it is indicated that each through-passageway 78 has a radial summit 80 in the second direction 72, a summit that belongs to the aforementioned junction zone 74.

More precisely, with reference to FIG. 4, it can be seen that the passageways 78 used for the bolts 56 to pass through all have substantially identical shape and dimensions, so that, in cross section of the flange passing through these through-passageways 78, or else in the view in cross section of this FIG. 4, the junction zone 74 takes the form of a circle centered on the axis 6. In addition, it can be seen that the radial summit 80 of each through-passageway 78 takes the form of a point belonging to the circle 74, because the bottom of each of the scallops 78 preferably has a slight curvature oriented radially inward, in the first direction 70. In this respect, it is specified, as shown in FIG. 3, similar to a diametral or radial section, that this radial summit 80 takes in this section the form of a right-hand segment preferably parallel to the axis 6 (not shown) and extending over the whole length of the passageway 78 in the direction of this same axis. In addition, this same right-hand segment 80 belongs entirely to the junction zone 74.

FIG. 3 shows that the balance weights 54 (only one being visible in FIG. 3) are fixedly mounted onto the balancing flange 52 by means of one or more screw/nut assemblies 56 each passing through one of the passageways 78, each weight 54 preferably being fitted to the flange 52 with the aid of two screw/nut assemblies 56 passing respectively through two directly consecutive passageways 78 in the tangential direction of the flange 52, as will be detailed later.

In addition, the assembly 56 therefore comprises a screw 84 having a screw head 86 pressing against a first face 90 or downstream face of the flange 52, substantially orthogonal to the axis 6 and facing the face 48 of the labyrinth disk 32. The assembly also comprises a nut 88 mounted on a threaded portion of the screw, and this nut 88 pressing against an outer face of the associated weight 54, of which one internal face is for its part pressing against a second face 92 or upstream face of the flange 52, substantially orthogonal to the axis 6 and opposite to the first face 90.

Therefore, from upstream to downstream, a stack of the nut 88, the weight 54, the flange 52 and finally the screw head 86 is provided, these elements preferably being in contact two by two.

As is shown in FIGS. 2 to 4, to prevent overstressing the flange 52 at each passageway radial summit 80, it is proposed to transfer the axial stresses due to the clamping of the screw/nut assembly 56 passing through the passageway in question, by making judiciously positioned recesses.

Effectively, for each of the scallops 78, the balancing flange 52 has, on its first face 90, a first recess 94 passing via the radial summit 80 that is under great tangential stress, and extending along the junction zone 74, and radially on either side of the latter. In other words, the recess 94 extends both to the annular core 64 and the pierced portion 66 so that it can then be considered that it opens into the scallop 78 concerned. As shown in FIG. 3, the first recess 94 being deprived of contact with the screw head 86, the pressure of the latter on the balancing flange 52 is therefore applied to the first face 90 at a distance from the radial summit 80 that is under great tangential stress, which makes it possible to apply virtually no axial stress at this same summit 80. The axial stress applied to the flange 52 and due to the clamping of the assembly 56 is therefore advantageously transferred radially in the second direction 72, to the heart of the annular core 64 against which the screw head 86 is pressing.

As an indication, the recess 94 is preferably made sufficiently deeply in the first direction 70, so as to cover the totality of the curved bottom of the scallop 78. Therefore, by continuing in this same first direction 70, the screw head 86 can find contact with the contour of the scallop 78, contrary to what is sought around the zone of the radial summit 80.

For reasons of ease of manufacture and as can be best seen in FIG. 4, the first recesses 94 preferably consist of a single circular groove 96 made on the first face 90, this groove 96, preferably of semicircular section, being centered on the axis 6 and along the junction zone 74 in the form of a circle.

In a similar manner that will be described in less detail below, the balancing flange 52 also has on its second face 92, for each scallop 78, a second recess 98 passing through its radial summit 80 and extending on either side of the junction zone 74, this second recess 98 being deprived of contact with the balance weight 52. Here again, the totality of the second recesses 98 of the face 92 may be achieved by a single circular groove 99 made on this second face 92, this groove 99, preferably of semicircular section, being centered on the axis 6 and along the junction zone 74 in the form of a circle. In a general manner, there is a similarity between the first recesses 94 and the second recesses 98 because the latter are preferably symmetrical relative to a given transverse plane.

As shown in FIG. 3, each second recess 98 being deprived of contact with the weight 54, the pressure of the latter on the balancing flange 52 is therefore applied to the second face 92 at a distance from the radial summit 80 that is greatly stressed tangentially, which makes it possible to apply virtually no axial stress at this same summit 80. The axial stress applied to the flange 52 and due to the clamping of the assembly 56 is therefore advantageously transferred radially in the second direction 72, to the heart of the annular core 64 against which the screw head 86 is pressing.

Figure 5:
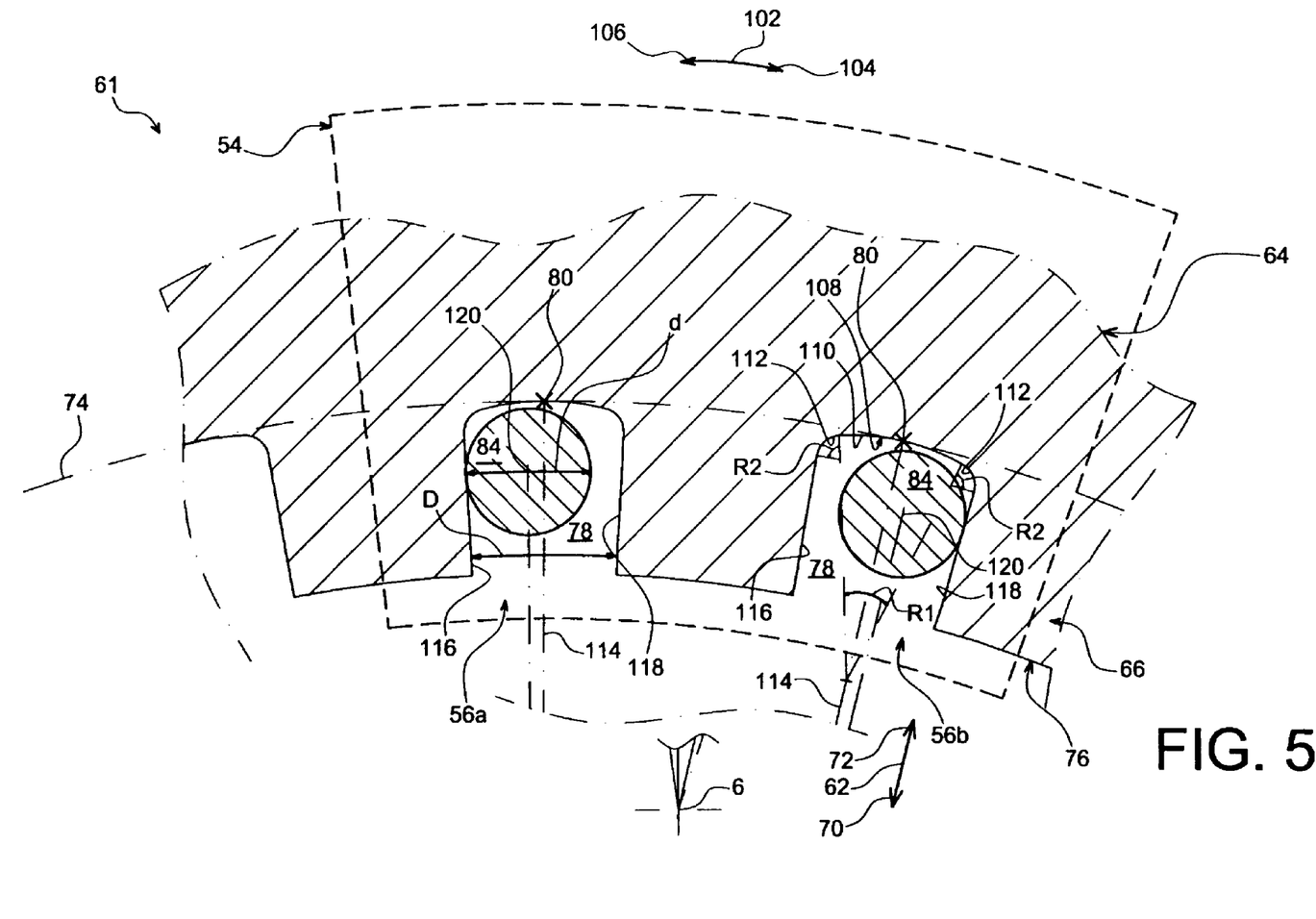
FIG. 5 shows a partial view in section along the line V-V of FIG. 1.

Now with reference to FIG. 5, showing one of the particular features of the present invention, preferably combined with the production of the recesses described above with reference to FIGS. 2 to 4, it can be seen that each weight 54 (only one being shown schematically in dashed lines) is mounted fixedly onto the balancing flange 52 with the aid of two screw/nut assemblies.

Effectively, a first screw/nut assembly referenced 56a is provided comprising a first screw 84 passing through a first passageway 78, and a second screw/nut assembly referenced 56b also comprising a second screw 84 passing through a second passageway 78, offset from the first passageway 78 in a first direction 104 of the tangential direction 102, this first direction 104 opposite to a second direction 106 corresponding therefore to the clockwise direction in FIG. 5.

As is schematized for the second passageway 78 taking the form of a scallop, while being applicable to all the through-passageways 78, it is noted that in cross section of the flange passing through these through-passageways 78, or else in the view in cross section of FIG. 5, a radial end portion 108 of the passageway in question in the second direction 72 consists of an arc of a circle 110 of radius R1, on either side of which there are two arcs of a circle 112 of radius R2 that is smaller than the radius R1. More precisely, the arc of a circle 110 forms the major part of this radial end portion 108, and incorporates in its center the aforementioned radial summit 80. Also, the radius R1 of the two arcs of a circle 112 that delimit the radial end portion 108 is substantially identical to the radius of the screw 84, which makes it possible if necessary to obtain a surface contact between the screw 84 and one of these two arcs of a circle 112.

Preferably, the scallop 78 has an axis of symmetry 114 extending radially, that is to say in the direction 62, this axis of symmetry 114 therefore passing through the disk axis 6 and the radial summit 80. Consequently, the two arcs of a circle 112 are therefore symmetrical relative to the axis 114, and may each form an integral part of a tangential end side of the passageway.

In this respect, each of the two passageways 78 has a first tangential end side 116, preferably initiated at the junction between the central arc of a circle 110 and the arc of a circle 112 situated nearest to the end in the second direction 106, and that continues in a known manner for a flat portion that is substantially straight and parallel to the radial direction 62 and to the axis of symmetry 114, up to the radial free flange end 76. In a similar manner, each of the two passageways 78 has a second tangential end side 118, preferably initiated at the junction between the central arc of a circle 110 and the arc of a circle 112 situated nearest the end in the first direction 104, and that continues also via a flat portion that is substantially straight and parallel to the radial direction 62 and to the axis of symmetry 114, up to the radial free flange end 76.

One of the particular features of this configuration resides in providing each screw 84 to be of smaller diameter than the tangential width of the scallop 78 that it passes through, so that the radial end portion 108 extends over a great tangential distance making it possible to reduce the concentration of stresses on and close to the radial summit 80, particularly thanks to its evolutive and softened shape. Accordingly, it is therefore provided that a maximum tangential distance D between the two tangential end sides 116, 118, corresponding to the constant distance between the two flat portions of these sides 116, 118, is greater than a maximum tangential length d of said screw 84 substantially identical to the value of the diameter of the latter, the ratio D/d lying between 1.2 and 2, and preferably close to 1.5.

In addition, to ensure the tangential retention of the weight 54 on the balancing flange 52, provision is first of all made for the first screw 84 of the first assembly 56a to be pressing against the first tangential end side 116 of the first through-passageway 78, and more precisely pressing and in contact against the flat portion of this side 116, close to the junction with the arc of a circle 112 as shown in FIG. 5. Therefore, the screw is no longer in contact with this arc of a circle 112, nor in contact with the central arc of a circle 110 incorporating the radial summit 80. Furthermore, because of the particular dimensioning of the various elements above, the first screw 84 is therefore situated at a distance from the second tangential end side 118 from which it is tangentially offset in the second direction 106. This arrangement naturally makes it possible to hold the weight 54 traversed virtually without clearance by the screw 84, in the second direction 106 relative to the flange 52.

Similarly, provision is also made for the second screw 84 of the second assembly 56b to rest against the second tangential end side 118 of the second through-passageway 78, and more precisely pressing and in contact against the flat portion of this side 118, close to the junction with the arc of a circle 112 as shown in FIG. 5. Therefore, the screw is no longer in contact with this arc of a circle 112, nor in contact with the central arc of a circle 110 incorporating the radial summit 80. Furthermore, again because of the particular dimensioning of the various elements above, the second screw 84 is therefore situated at a distance from the first tangential end side 116 from which it is tangentially offset in the first direction 104. This arrangement naturally makes it possible to hold the weight 54, also traversed virtually without clearance by the second screw 84, in the first direction 104 relative to the flange 52.

Finally, in order to translate the "off-center" positioning of the screws 84 in their respective passageways, it can be seen in FIG. 5 that a screw axis 120 of the first screw is tangentially offset in the second direction 106 relative to the axis of symmetry 114 of the first passageway, while a screw axis 120 of the second screw 84 is tangentially offset in the first direction 104 relative to the axis of symmetry 114 of the second passageway.

Naturally, various modifications may be made by those skilled in the art to the invention that has just been described, only as nonlimiting examples. Accordingly, it is noted that, although the preferred embodiments have been described and represented with through-passageways taking the form of scallops, these passageways may alternatively be made with the aid of simple holes through the balancing flange, without departing from the context of the invention.

What is claimed is:

1. A turbomachine rotor balancing system comprising a balancing flange provided with a plurality of through-passageways, said system also comprising a plurality of balance weights each mounted fixedly onto said balancing flange by means of a first and a second screw/nut assembly having respectively a first screw and a second screw passing respectively through a first and a second directly consecutive passageway, each of said passageways having a first and a second tangential end side situated on either side of the screw of said associated screw/nut assembly, said second tangential end side being offset tangentially from the first tangential end side in a first direction and said first through-passageway being offset tangentially from said second through-passageway in a second direction opposite to the first direction, wherein said first screw is pressing against said first tangential end side of said first through-passageway and at a distance from said second tangential end side, and wherein said second screw is pressing against said second tangential end side of said second through-passageway and at a distance from said first tangential end side.

2. The balancing system as claimed in claim 1, wherein, in cross section of the flange passing through said through-passageways, for each of said through-passageways, a maximum distance (D) in the tangential direction between the two tangential end sides is greater than a maximum length (d) of said screw in this same tangential direction, so that the ratio D/d lies between 1.2 and 2.

3. The balancing system as claimed in claim 2, wherein, in cross section of the flange passing through said through-passageways, each of said through-passageways has an axis of symmetry extending radially, and wherein a screw axis of said screw passing through said passageway is offset tangentially from said axis of symmetry.

4. The balancing system as claimed in claim 1, wherein, in cross section of the flange passing through said through-passageways, each of said through-passageways has an axis of symmetry extending radially, and wherein a screw axis of said screw passing through said passageway is offset tangentially from said axis of symmetry.

5. The balancing system as claimed in of claims 1-4 or 3, wherein, in cross section of the flange passing through said through-passageways, each of said through-passageways has a radial end portion consisting of an arc of a circle with a radius (R1) on either side of which are respectively two arcs of a circle with a radius (R2) less than the radius (R1).

6. The balancing system as claimed in claim 5, wherein said radius (R2) is substantially identical to the radius of said screw passing through said passageway.

7. The balancing system as claimed in claim 6, wherein each through-passageway takes the form of a scallop or a hole.

8. A turbomachine module which comprises at least one balancing system as claimed in claim 6.

9. The turbomachine module as claimed in claim 8, which is a turbine or a turbomachine compressor.

10. The balancing system as claimed in claim 5, wherein each through-passageway takes the form of a scallop or a hole.

11. A turbomachine module which comprises at least one balancing system as claimed in claim 5.

12. The turbomachine module as claimed in claim 11, which is a turbine or a turbomachine compressor.

13. The balancing system as claimed in of claims 1-4, wherein each through-passageway takes the form of a scallop or a hole.

14. A turbomachine module which comprises at least one balancing system as claimed in claim 13.

15. The turbomachine module as claimed in claim 14, which is a turbine or a turbomachine compressor.

16. A turbomachine module which comprises at least one balancing system as claimed in any of claims 1-4.

17. The turbomachine module as claimed in claim 16, which is a turbine or a turbomachine compressor.

18. A turbomachine comprising at least one module as claimed in claim 16.

* * * * *

UNITED STATES PATENT AND TRADEMARK OFFICE
CERTIFICATE OF CORRECTION

PATENT NO.         : 8,070,445 B2  
APPLICATION NO.    : 11/877217  
DATED              : December 6, 2011  
INVENTOR(S)        : Stephane Pierre Guillaume Blanchard et al.

It is certified that error appears in the above-identified patent and that said Letters Patent is hereby corrected as shown below:

IN THE CLAIMS:

Column 10, line 9, claim 5, change "of claims 1-4 or 3" to --any one of claims 1-4--;

Column 10, line 32, claim 13, change "of claims 1-4" to --any one of claims 1, 2 or 4--; and Column 10, line 40, claim 16, change "claims 1-4" to --claims 1, 2 or 4--.

Signed and Sealed this  
Sixth Day of March, 2012

David J. Kappos  
*Director of the United States Patent and Trademark Office*